US008116236B2

(12) United States Patent  (10) Patent No.: US 8,116,236 B2
Baird et al.  (45) Date of Patent: Feb. 14, 2012

(54) AUDIO CONFERENCING UTILIZING PACKETS WITH UNENCRYPTED POWER LEVEL INFORMATION

(75) Inventors: Randall B. Baird, Austin, TX (US); Luke K. Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1442 days.

(21) Appl. No.: 11/650,592

(22) Filed: Jan. 4, 2007

(65) Prior Publication Data

US 2008/0165707 A1 Jul. 10, 2008

(51) Int. Cl.
*H04L 12/16* (2006.01)
*H04M 3/42* (2006.01)
*G06F 15/16* (2006.01)

(52) U.S. Cl. .... 370/260; 370/267; 370/270; 379/202.01
(58) Field of Classification Search .................. None
See application file for complete search history.

(56) References Cited

U.S. PATENT DOCUMENTS

| 5,729,687 | A | 3/1998 | Rothrock et al. |
| 5,983,192 | A | 11/1999 | Botzko et al. |
| 6,009,519 | A | 12/1999 | Jones et al. |
| 6,014,427 | A | 1/2000 | Hanson et al. |
| 6,236,854 | B1 | 5/2001 | Bradshaw, Jr. |
| 6,259,405 | B1 | 7/2001 | Stewart et al. |
| 6,342,903 | B1 | 1/2002 | Fado et al. |
| 6,501,739 | B1 | 12/2002 | Cohen |
| 6,545,596 | B1 | 4/2003 | Moon |
| 6,590,604 | B1 | 7/2003 | Tucker et al. |
| 6,608,820 | B1 | 8/2003 | Bradshaw, Jr. |
| 6,671,262 | B1 | 12/2003 | Kung et al. |
| 6,816,469 | B1 | 11/2004 | Kung et al. |
| 6,865,540 | B1 | 3/2005 | Faber et al. |
| 6,876,734 | B1 | 4/2005 | Summers et al. |
| 6,885,900 | B1 | 4/2005 | Rybicki et al. |
| 6,905,414 | B2 | 6/2005 | Danieli et al. |
| 6,909,778 | B2 | 6/2005 | Wengrovitz |
| 6,931,001 | B2 | 8/2005 | Deng |
| 6,931,113 | B2 | 8/2005 | Ortel |
| 6,940,826 | B1 * | 9/2005 | Simard et al. ................. 370/260 |
| 6,985,745 | B2 | 1/2006 | Quaid |
| 6,987,744 | B2 | 1/2006 | Harrington et al. |
| 2004/0162747 | A1 | 8/2004 | Yeh et al. |
| 2004/0234046 | A1 | 11/2004 | Skladman et al. |
| 2005/0108746 | A1 * | 5/2005 | Futagami et al. ............... 725/31 |
| 2005/0135383 | A1 | 6/2005 | Shenefiel |
| 2005/0157708 | A1 | 7/2005 | Chun |
| 2005/0177622 | A1 | 8/2005 | Spielman et al. |
| 2005/0210112 | A1 | 9/2005 | Clement et al. |
| 2005/0262208 | A1 | 11/2005 | Haviv et al. |

(Continued)

*Primary Examiner* — Kevin C Harper
*Assistant Examiner* — Thinh Tran
(74) *Attorney, Agent, or Firm* — Baker Botts L.L.P.

(57) ABSTRACT

In one embodiment, a method that includes receiving a plurality of packet streams input from different endpoints, packets of each stream including encrypted and unencrypted portions, the unencrypted portion containing audio power level information. The audio power level information contained in the packets of each of the packet streams is then compared to select N packet streams with loudest audio. The N packet streams are then decrypted to obtain audio content, and the audio content of the N packet streams mixed to produce one or more output packet streams. It is emphasized that this abstract is provided to comply with the rules requiring an abstract that will allow a searcher or other reader to quickly ascertain the subject matter of the technical disclosure.

23 Claims, 6 Drawing Sheets

U.S. PATENT DOCUMENTS

| | | |
|---|---|---|
| 2006/0078120 A1 | 4/2006 | Mahendran et al. |
| 2006/0122835 A1 | 6/2006 | Huart et al. |
| 2006/0146735 A1 * | 7/2006 | Shaffer et al. .................. 370/260 |
| 2007/0133437 A1 * | 6/2007 | Wengrovitz et al. .......... 370/260 |

* cited by examiner

US 8,116,236 B2

AUDIO CONFERENCING UTILIZING PACKETS WITH UNENCRYPTED POWER LEVEL INFORMATION

TECHNICAL FIELD

The present disclosure relates to the field of audio transmissions over a communications network.

BACKGROUND

Modern conferencing systems facilitate communications among multiple participants over telephone lines, Internet protocol (IP) networks, and other data networks. The use of conferencing systems is becoming more prevalent, especially as the cost of transmissions over IP networks has dropped. As usage has increased, the number of participants that attend a given conference has also increased. One consequence is that audio mixers must now be capable of processing a large number of Real-Time Protocol (RTP) audio packet streams from the various participants to a given conference. This increase in the number of packet streams input to the audio mixer (or bridge) results in an increase in the number of computations and processing steps that must be performed. The increased number of conference participants also increases the overall noise that is sent to the audio mixer.

Many conferencing mixers are configured to identify and mix only the loudest few speakers participating in discussions during a conference session. By discarding or ignoring all but the loudest streams, conference quality is improved due to the elimination of extraneous noise in the audio mix. In a typical secure conferencing application, however, the audio mixer is required to first decrypt the Secure Real-Time Protocol packet (SRTP) packets received, and then partially or fully decode all of the audio payloads of each incoming stream before determining the average power level of each stream. Even in a regular RTP application with no encryption, the average power level must still be computed. Once the streams have been decrypted, decoded, and the audio power levels determined, the mixer must then compare all of the audio streams to determine the loudest speakers. For relatively large conferences where numerous RTP streams are input to the audio mixer this is a highly compute-intensive process that can overwhelm the processing capacity and bandwidth of the audio mixer.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, protocols, applications, methods, etc., in order to provide a thorough understanding of the present invention. However, persons having ordinary skill in the relevant arts will appreciate that these specific details may not be needed to practice the present invention.

Figure 1:
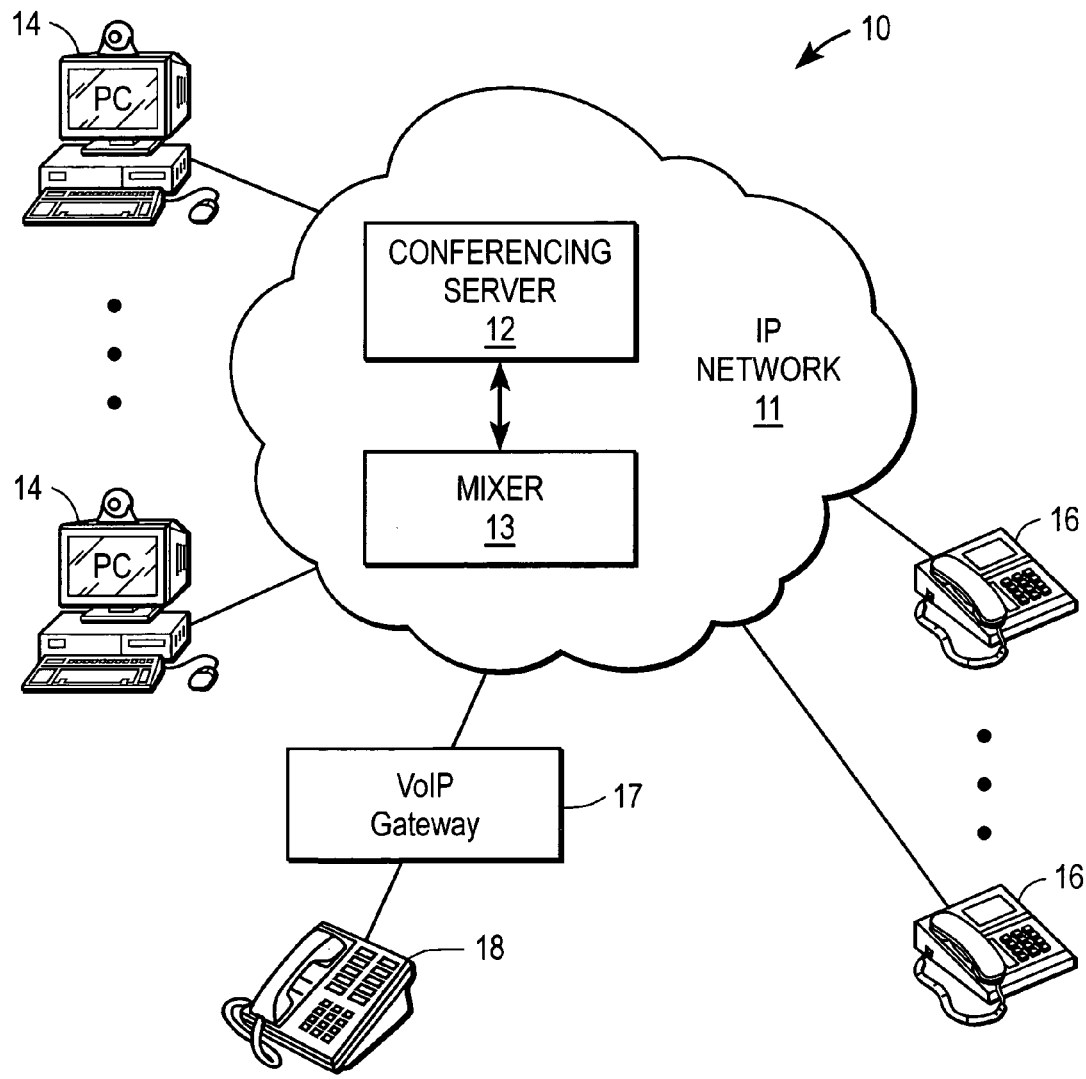
FIG. 1 illustrates an example conferencing system with multiple endpoints.

FIG. 1 illustrates an example conferencing system 10 with multiple endpoints 14, 16 and 18. Each of the endpoints is shown connected with a conferencing server 12 and a mixer 13 via Internet Protocol (IP) network 11. In this example, endpoints 14, 16 and 18 are sources and receivers of audio content—that is, they send audio from their microphones to an audio mixer 13, and receive back a customized mixed audio stream. The endpoint devices are shown comprising personal computers (PCs) 14 with softphone capabilities for placing/receiving calls, voice over IP (VoIP) phones 16, and a conventional telephone device 16 connected to a Public Switched Telephone Network (PSTN) line that communicates with IP network 11 via a voice VoIP gateway 17. Each of endpoint devices 14-16 and VoIP gateway 17 includes a processor and executable code that supports the functionality described below. Other endpoint devices not specifically shown in FIG. 1 that may be used to initiate or participate in a conference session include a personal digital assistant (PDA), a laptop or notebook computer, or any other device, component, element, or object capable of initiating or participating in voice or packet-data exchanges with system 10 in accordance with the protocols and methods described herein.

Conferencing server 12 may comprise a conferencing or meeting scheduling system application that includes software (or firmware) plug-ins, modules, or enhancements that implement the various features and functions described herein. In a specific implementation, for example, conferencing server 12 may run a modified or enhanced IP communication system software product such as Cisco's MeetingPlace™ conferencing application that allows users to schedule and attend meeting conferences. In the embodiment shown, conference server 12 handles all of the control plane functions of the conference session and manages audio transmissions and communications from the endpoints.

Mixer 13 is coupled to conferencing server 12 and is responsible for receiving audio packet streams from the plurality of endpoints, processing and mixing the streams and sending back to the plurality of endpoints a mixed stream. It should be further understood that audio mixer 13 represents any device or component that combines more than one audio input stream to produce a composite audio output stream. By way of example, mixer 13 may include a digital signal processor (DSP) or firmware/software-based system that mixes and/or switches audio (and possibly video) signals received at its input ports under the control of conferencing server 12. It should be further understood that conference server 12 and mixer 13 comprise logical entities which may be implemented on a single hardware unit or box.

The audio signals received at the conference server ports originate from each of the conference or meeting participants (e.g., individual conference participants using endpoint devices 14, 16 and 18) and possibly from an interactive voice response (IVR) system (not shown). Conference server 12 may also incorporate or be associated with a natural language automatic speech recognition (ASR) module for interpreting and parsing speech of the participants, as well as standard speech-to-text (STT) and text-to-speech (TTS) converter modules. It should be understood that in some embodiments, mixer 13 and server 12 may be combined or incorporated in a single unit.

Practitioners in the art will appreciate that the actual media paths to the endpoint devices are normally established by conferencing server 12. In other words, conferencing server 12 is responsible for engaging the necessary media components/resources to satisfy the media requirements of each of the endpoints participating in a given conference session. In operation, each of the endpoint devices shown in FIG. 2 may join a conference session by calling into a conferencing application running on conferencing server 12.

In the example of FIG. 1, normalized audio power level data across multiple frequency bands is stored in an unencrypted portion of the audio packets received at mixer 13. This means that the audio power level information of each stream is directly accessible without the need for packet decryption such that the mixer can readily determine which audio packet streams comprise the N (where N is an integer) loudest speakers. Mixer 13 decrypts the audio streams of the N loudest speakers and discards the remaining input streams. After mixing, the resulting audio streams are output back to the various endpoint devices. It is appreciated that different endpoints may receive different output audio streams from mixer 13. For instance, a participant who is one of the N loudest speakers is normally sent a stream that includes the other (N−1) loudest speakers, but does not include his own speech.

The audio power level data included in the audio packet streams is generated by the encoder normally associated with each of endpoint devices 14, 16 and VoIP gateway 17. According to one embodiment, during processing of the audio input received at each endpoint, a moving average of the normalized power levels of the audio input at multiple frequencies is computed and included or embedded within the audio packets. The multiple frequencies represent different types of audio input and are subsequently used by mixer 13 to distinguish which audio packets represent speech. The multi-frequency power level information also allows mixer 13 to quickly assess and compare the incoming audio packets to determine which streams contain the loudest speech. The encoder associated with each endpoint may also include timebase information used to obtain or generate the moving average.

In another embodiment, packets of each of the multiple audio streams generated by the various endpoints include header and payload portions, the header portion containing audio power level information that includes power levels for each of a respective plurality of frequencies. The header portion may or may not include portions that are encrypted. The audio power level information contained in the packets of each of the packet streams is compared by the mixer to select N, where N is an integer greater than or equal to one, packet streams having the loudest speech. The mixer decodes the N packet streams to obtain the audio content contained in the payload portion of each of the N packet streams. The mixer then mixes the audio content of the N packet streams to produce one or more output packet streams.

Figure 2:
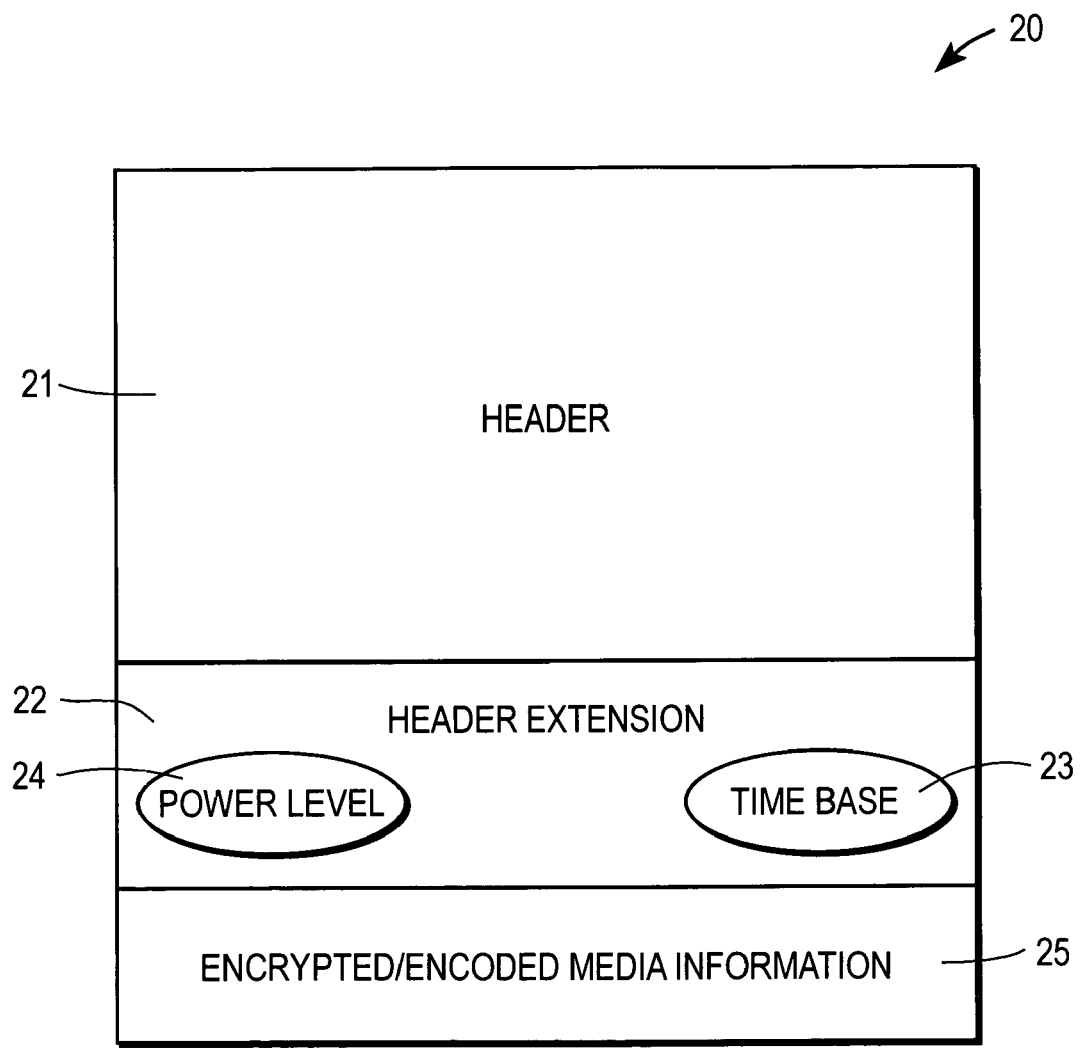
FIG. 2 illustrates an example audio packet that contains power level and time base information sent to the audio mixer.

FIG. 2 illustrates an example audio packet 20 that contains power level and timebase information sent by an endpoint device to the audio mixer. It should be understood that any transport protocol consistent with the general packet format shown in FIG. 2 may be used for the audio stream communications from the individual endpoints to mixer 13. Packet 20 includes a header section 21, a header extension section 22, and a payload section 25, the latter including the encrypted and encoded audio media content. Header 21 provides information to the mixer regarding the type and name of the packet being sent, the type, name and format of the payload, and other identifier information, such as a timestamp or source and destination location. Header extension 22 includes normalized power level and timebase information (represented by ellipses 24 and 23, respectively) of the audio communication produced at the corresponding endpoint. In one embodiment, the normalized power level and timebase information may be transported as an extension to known RTP payload specifications such as G.711, G.729, G.723, etc. Alternatively, the power level and time base information may be carried in a separate but related payload type.

In one embodiment, normalized power level information 24 comprises a current moving average of the normalized power level at a small number of key frequencies. By transporting multi-frequency power level information the audio mixer can readily distinguish between loud speech and loud noise (e.g., wind, heavy breathing, machinery, etc.) Timebase information 23 provides a timebase from which the moving average may be computed. Timebase information 23, as well as normalized power level information 24 included in header extension 22, is unencrypted and independent of the specific payload content in packet section 25.

Practitioners in the art will appreciate that the normalized power level information may be computed by the endpoint in the course of encoding the RTP packet. Upon receiving packet 20, audio mixer 13 may determine the normalized power levels at the various frequencies without having to decrypt the packet. Using a standard algorithm, the N loudest speakers may then be computed based on the normalized power level information obtained from all of the incoming streams. Once the streams having the N loudest speakers have been identified, mixer 13 may discard the other remaining RTP audio packet streams without decoding or decrypting them.

In another embodiment, the audio mixer sends back a RTP Control Protocol (RTCP) receiver report to adjust the time base of the moving average computation. This enhancement allows the mixer to control the sensitivity of the stream selection process, e.g., avoiding transient voice spikes on the input RTP streams.

Figure 6:
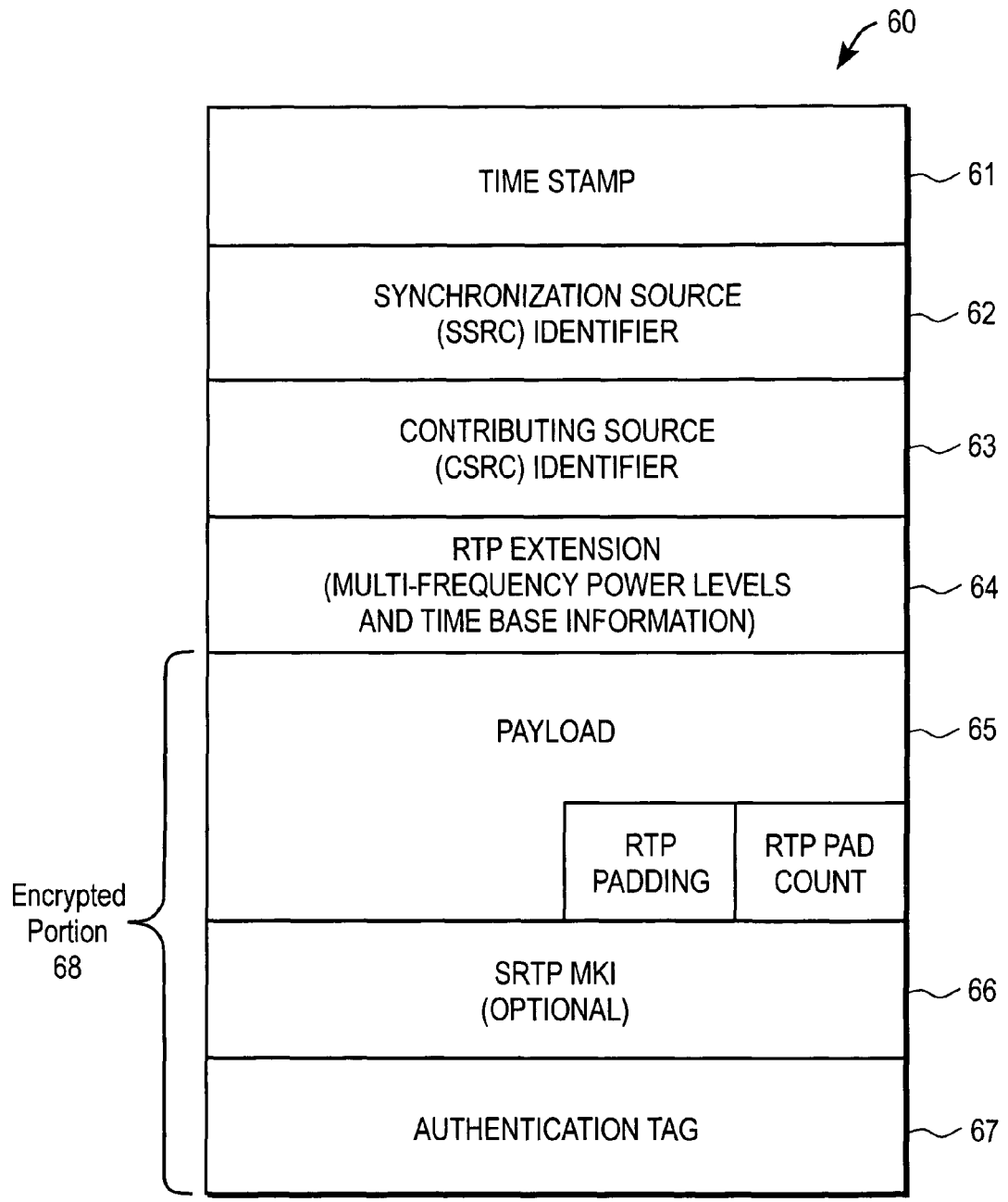
FIG. 6 illustrates an example format of a SRTP packet with an RTP extension that includes unencrypted power level and time base information.

FIG. 6 illustrates an example format of an SRTP packet 60 that includes a RTP extension 64 into which is placed the multi-frequency power level and timebase information. Note that the unencrypted portion of packet 60 includes the time stamp 61, the synchronization source identifier (SSRC) 62, the contributing source identifier (CSRC) 63 and RTP extension 64. The SSRC 62 identifies the immediate source of the packet stream. If the RTP stream has been previously mixed or modified, the CSRC 63 identifies the original sources of the RTP streams that now comprise the current stream. In one embodiment, the multi-frequency power level and timebase information is intentionally placed into RTP extension 64 so that it remains unencrypted and unencoded. The encrypted portion 68 of packet 60 includes the payload 65 (including RTP padding and pad count, when present), SRTP Master Key Identifier (MKI) 66 and the authentication tag 67.

Payload 65 contains the actual audio media content, converted into the appropriate format for the conferencing mixer. In one embodiment, SRTP packet 60 may be any one of a number of payload types, such as G.711, G.729, iLBC, G.722, etc. The information to be included within RTP extension 64 is not specific to a particular payload and no additional information is required to be included in encrypted portion 68 of SRTP packet 60.

Figure 3:
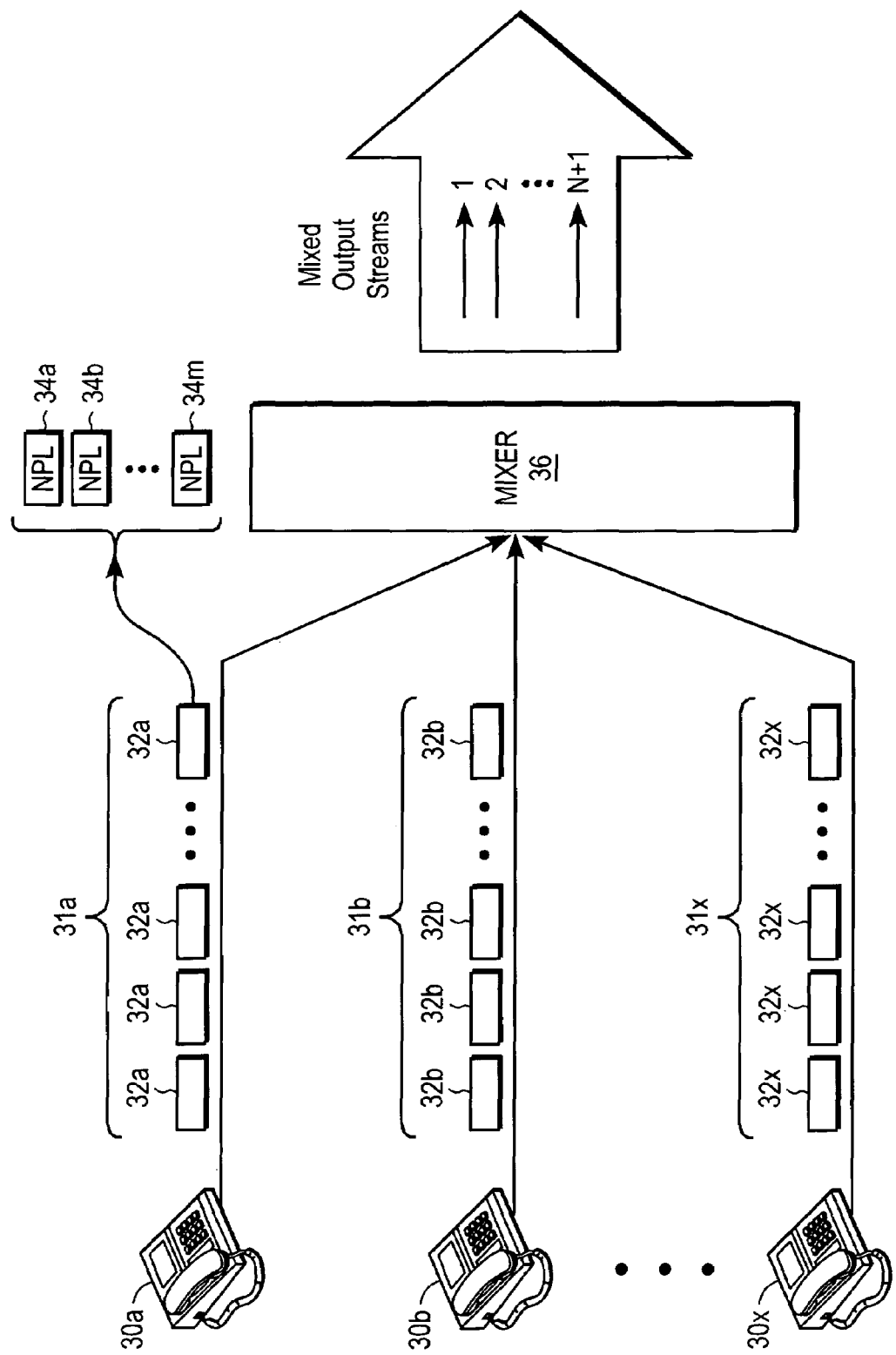
FIG. 3 illustrates an example operation wherein incoming audio streams from multiple endpoints are mixed, with the mixed output streams sent to the endpoints.

FIG. 3 illustrates an example operation wherein incoming audio streams 31a-31x originating from corresponding endpoints 30a-30x are mixed, with the mixed output streams being sent back to the endpoints. Mixer 36 receives a plurality of packets 32 associated with each stream 31. The packets originate from the endpoints participating in the conference session. An encoder associated with or incorporated into each endpoint changes the audio communications contained within packets 32 into a format readable by mixer 36. Each packet contains, in part, audio communications that have been encrypted and encoded. Each packet also contains normalized power levels represented in FIG. 3 by boxes or bins 34a-34m. Each box represents a normalized power level (NPL) taken at a different, discrete frequency. The encoder inputs the normalized power levels during the same process of encoding the audio communications. Upon arrival, the normalized power levels at the various frequencies in the unencrypted portion of the incoming packets of each stream 31 are examined by mixer 36. This frequency bin information may be used by mixer 36 to distinguish a participant's speech from background noise. For instance, during the course of a conference there are many background noises (e.g., from cars, construction, wind, etc.) that can interfere with the communication between the participants. Sometimes, these background noises can actually be louder than the participant's speech.

Mixer 36 compares the packets that have the highest power levels at certain specified frequencies, i.e., those frequencies that correspond to human speech. Mixer 36 may quickly perform this comparison by examining the unencrypted header extension portion of the packet. In one embodiment, mixer 36 is capable of selecting up to N (where N is an integer) loudest packet streams, as specified by the conferencing server or as specified within the mixer itself. All the remaining, unselected packets are discarded without any decryption or decoding. Mixer 36 only decrypts and decodes the selected N packet streams. From the decrypted and decoded N streams, mixer 36 generates customized mixed output audio streams (e.g., shown in FIG. 3 as output streams 1, 2 . . . N+1) that are then sent back to the endpoint devices of the conference.

Practitioners will appreciate that the output stream generated for a participant who currently is one of the loudest N speakers typically does not include that participant's speech. In other words, the customized stream generated for that participant will differ from the output stream sent to the other participants. There are therefore N customized streams produced for the N loudest speakers, plus one additional stream containing a mix of all speakers, to be sent to all participants who are not currently one of the loudestspeakers.

Figure 4:
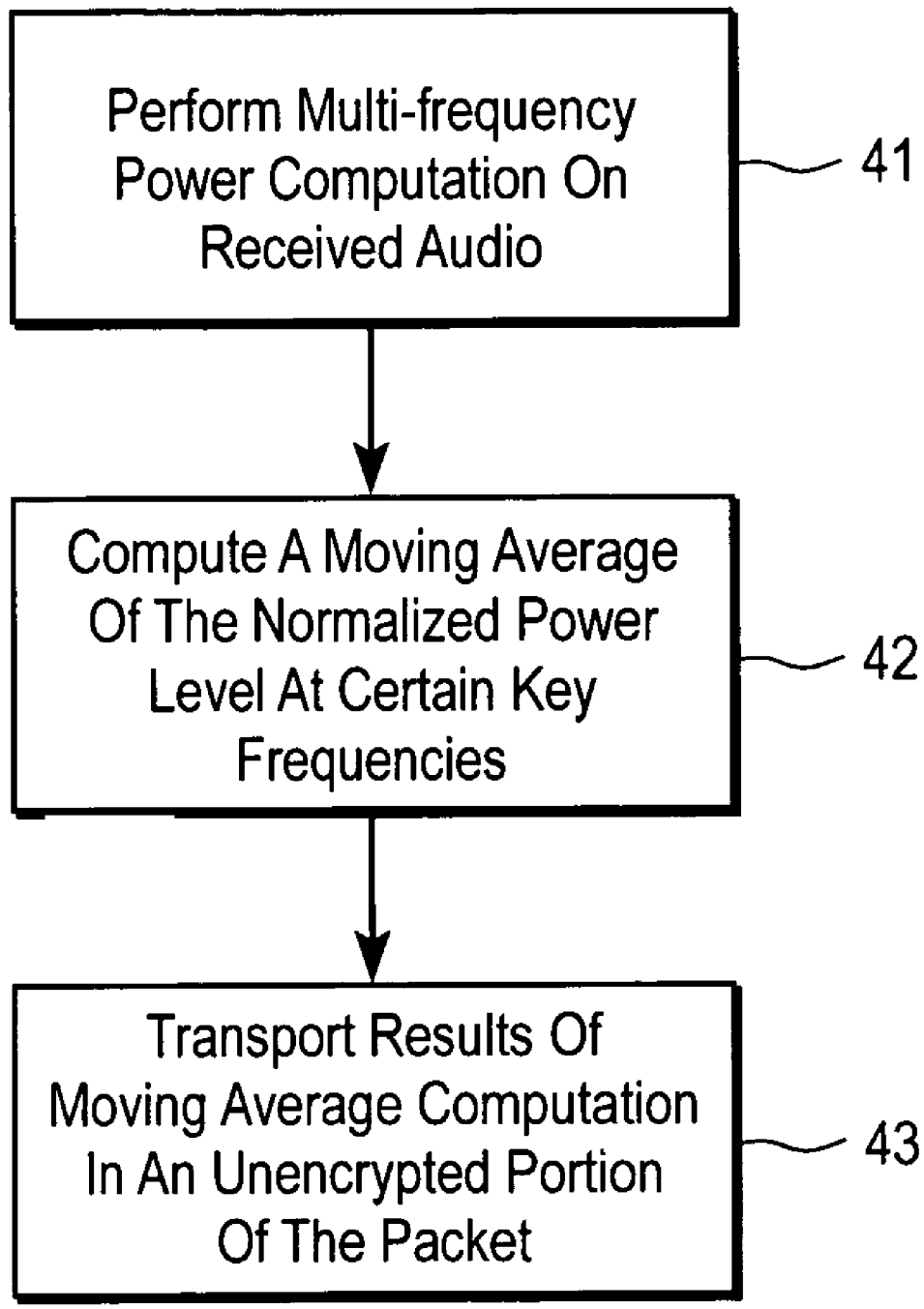
FIG. 4 illustrates an example method for performing computations on audio communications to be sent over a network by an endpoint device.

FIG. 4 illustrates an example method for performing computations on audio communications to be sent over a network by an endpoint device. The process begins with the encoder of an endpoint device performing multi-frequency power level computations on the audio communications received (e.g., from a microphone) during a conference session (block 41). After performing the multi-frequency power level computations on the received audio, the endpoint device encoder next computes a moving average of the normalized power levels at certain key frequencies, i.e., those frequencies that correspond to human speech. This step is shown by block 42 in FIG. 4. Once the moving average values have been computed at the key frequencies, the results are transported to the mixer in an unencrypted portion of the packet (block 43). Note that timebase information utilized in the computation of the moving average may also be included in the unencrypted portion of the packet.

It should be understood that the timebase is ordinarily an unfixed value; that is, the timebase may be adjusted to meet the necessary sensitivity needs of the conferencing mixer to better distinguish speech from other noise. It is further appreciated that the audio communications may include human speech, noise, or both. As discussed previously, the normalized, multi-frequency power level information resulting from the computations is placed into the unencrypted portion of the outgoing packets.

Figure 5:
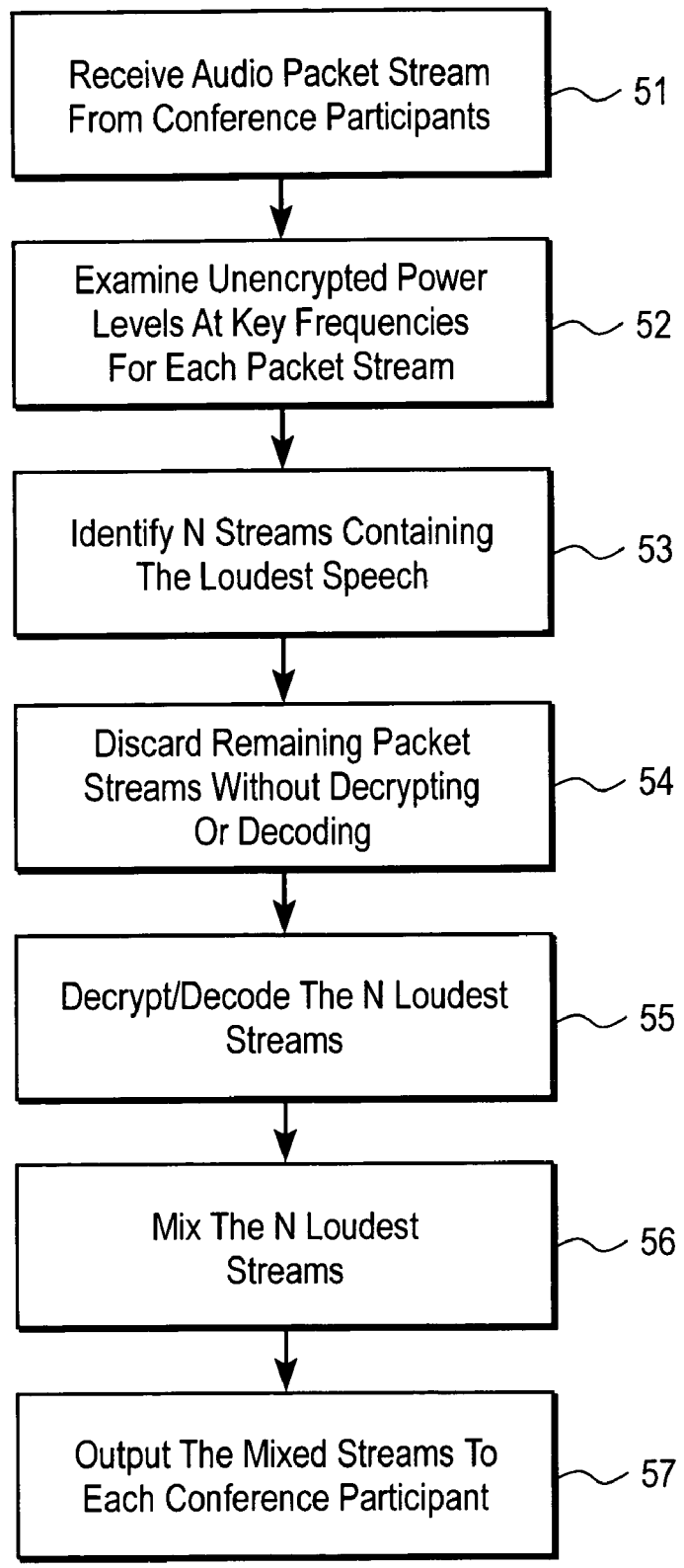
FIG. 5 illustrates an example method for mixing audio packet streams from multiple conference participants.

FIG. 5 illustrates an example method for mixing audio packet streams from multiple conference participants. The example method shown begins with the conferencing mixer receiving the audio packet streams from the various endpoints associated with the participants to the conference session (block 51). Next, the mixer examines the unencrypted portion of the incoming packets in order to compare the power level information at the key frequencies for each stream (block 52). Since each packet stream represents audio received from a different endpoint, a comparison of the power levels of each stream allows the mixer to quickly identify which streams contain the loudest speech (block 53). After selecting the N loudest streams, the remaining packet streams are discarded or ignored (block 54) without being decrypted or decoded. Only the loudest N packet streams are decrypted/decoded, which step is shown occurring at block 55. The audio contained in the N loudest streams is then mixed (block 56) by the mixer to produce a set of customized output audio streams that are respectively sent to each of the endpoints associated with the corresponding conference participants, plus a single mixed stream containing all of the loudest participants, which is sent back to all participants who are not currently the loudest speakers (block 57).

In another embodiment, the mixer may create a receiver report on the power level results. The report can provide statistics on the audio packets sent from the endpoint encoder to the conferencing mixer. The mixer can then send the report to each endpoint along with the mixed output stream. The report may include information on an adjusted time base for the moving average computations. Adjusting the time base may allow the mixer to control the sensitivity of the packet stream selection process. In the case where the audio packets are formatted as an SRTP packet, a RTCP receiver report may be generated by the mixer and sent back to the endpoints.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method comprising:
   receiving a plurality of packet streams input from different endpoints, packets of each stream including header and payload portions, the header portion including first and second portions, the second portion containing audio power level information that includes power levels for each of a respective plurality of frequencies, each power level comprising a moving average of a normalized power level at a particular frequency, the second portion further including timebase information associated with the moving average;
   comparing the audio power level information contained in the packets of each of the packet streams at a particular point in time to select N, where N is an integer, greater than or equal to one, packet streams with loudest audio;
   decoding the N packet streams to obtain audio content contained in the payload portion of each of the N packet streams; and
   mixing the audio content of the N packet streams to produce one or more output packet streams.

2. The computer-implemented method of claim 1, wherein the first portion of the header is encrypted, the second portion of the header containing the audio power level information is unencrypted, and all or a portion of the payload is encrypted.

3. The computer-implemented method of claim 2 wherein each of the packets has a packet format compatible with Secure Real-Time Protocol (SRTP).

4. The computer-implemented method of claim 1 further comprising sending the one or more output packet streams to the different endpoints.

5. The computer-implemented method of claim 1 further comprising discarding a remainder of the packet streams.

6. The computer-implemented method of claim 1 wherein the frequencies include at least one frequency associated with human speech.

7. The computer-implemented method of claim 1 wherein each of the packets has a packet format compatible with Real-Time Protocol (RTP).

8. The computer-implemented method of claim 1 further comprising:
   generating a report that contains statistics regarding the audio content and an adjusted timebase; and
   sending the report to at least the endpoints associated with the N packet streams.

9. A computer-implemented method comprising:
   receiving a plurality of packet streams input from a corresponding plurality of endpoints, packets of each stream including header and payload portions, the header portion containing audio power level information that includes timebase information and a moving average of normalized power levels for each of a respective plurality of frequencies, wherein portions of the header and payload are encrypted the timebase information and the moving average being included in an unencrvpted portion of the header;
   comparing the audio power level information contained in the packets of each of the packet streams at a particular point in time to select N, where N is an integer greater than or equal to one, packet streams with loudest audio;
   decoding the N packet streams to obtain audio content contained in the payload portion of each of the N packet streams; and
   mixing the audio content of the N packet streams to produce N+1 output packet streams.

10. The computer-implemented method of claim 9 wherein N of the output packet streams are each customized for a corresponding one of the endpoints.

11. The computer-implemented method of claim 9 further comprising:
    encoding and encrypting each of the output packet streams; and
    sending the encoded and encrypted output packet streams to the endpoints.

12. The computer-implemented method of claim 9 wherein the frequencies include at least one frequency associated with human speech.

13. The computer-implemented method of claim 12 wherein the loudest audio of the N packet streams is determined with respect to the at least one frequency.

14. The computer-implemented method of claim 9 further comprising discarding a remainder of the packet streams.

15. The computer-implemented method of claim 14 wherein the remainder of the packet streams includes all of the packet streams, except for the N packet streams.

16. The computer-implemented method of claim 9 wherein the unencrypted portion comprises a Real-Time Protocol (RTP) extension section.

17. A non-transitory machine-readable storage medium encoded with a computer program, when executed, the computer program operable to:
    receive a plurality of packet streams input from different endpoints, packets of each stream including encrypted and unencrypted portions, the unencrypted portion containing audio power level information that includes a moving average of normalized power levels for each of a respective plurality of frequencies, the audio power level information further including timebase information associated with the moving average;
    compare the audio power level information contained in the packets of each of the packet streams at a particular point in time to select N, where N is an integer greater than or equal to one, packet streams with loudest audio;
    decrypt the N packet streams to obtain audio content contained in the encrypted portion of each of the N packet streams; and
    mix the audio content of the N packet streams to produce one or more output packet streams.

18. The non-transitory machine-readable storage medium of claim 17 wherein, when executed, the computer program is further operable to send the one or more output packet streams to the different endpoints.

19. The non-transitory machine-readable storage medium of claim 17 wherein, when executed, the computer program is further operable to discard a remainder of the packet streams.

20. The non-transitory machine-readable storage medium of claim 17 wherein the frequencies include at least one frequency associated with human speech.

21. A system comprising:
    a conferencing server; and
    a mixer coupled to receive control information from the conferencing server, the mixer being operable to:
        examine an unencrypted portion of each of a plurality of packets associated with streams input from corresponding endpoints, the unencrypted portion containing audio power level information at one or more frequencies associated with human speech, the audio power level information including a moving average of normalized power levels at the one or more frequencies, the unencrypted portion further including a timebase associated with the moving average;

select, based on the audio power level information, N packet streams having highest power levels, where N is an integer greater than or equal to one;

mix audio content from the N packet streams to produce a plurality of output packet streams; and send the output packet streams to the endpoints.

22. The system of claim 21 wherein the unencrypted portion comprises a Real-Time Protocol extension section.

23. The system of claim 21 wherein the mixer is further operable to:

generate a report that contains statistics regarding the audio content and an adjusted timebase; and send the report to at least the endpoints associated with the N packet streams.

\* \* \* \* \*